Sept. 22, 1970 J. C. COYNE ET AL 3,529,682

LOCATION DETECTION AND GUIDANCE SYSTEMS FOR BURROWING DEVICE

Filed Oct. 3, 1968 8 Sheets-Sheet 1

INVENTORS J. C. COYNE
F. J. ELIA
H. SOUTHWORTH, JR.
BY Charles E. Graves
ATTORNEY

LOCATION DETECTION AND GUIDANCE SYSTEMS FOR BURROWING DEVICE

Filed Oct. 3, 1968 8 Sheets-Sheet 5

LOCATION DETECTION AND GUIDANCE SYSTEMS FOR BURROWING DEVICE

United States Patent Office 3,529,682
Patented Sept. 22, 1970

3,529,682

LOCATION DETECTION AND GUIDANCE SYSTEMS FOR BURROWING DEVICE

James C. Coyne, New Providence, and Frederick J. Elia, Berkeley Heights, N.J., and Hamilton Southworth, Jr., New York, N.Y., assignors to Bell Telephone Laboratories, Incorporated, Murray Hill, N.J., a corporation of New York Filed Oct. 3, 1968, Ser. No. 764,750
Int. Cl. E21b *47/24;* F16l *1/00*
U.S. Cl. 175—45 10 Claims

ABSTRACT OF THE DISCLOSURE

Dipole and quadrupole antenna loops laid over the intended route of a burrowing device are respectively energized with two currents differing by a time, frequency or phase factor. The magnetic fields under the loops thus also differ by such factor. Three coils fixed in the device body in known mutually orthogonal orientation detect and measure the spatial components of each of the magnetic fields produced by the respective loops. From the six magnetic field readings, the device's position within the plane perpendicular to the antenna loop plane, and the device's roll and heading, are calculated and translated into guidance commands.

FIELD OF THE INVENTION

This invention relates to burrowing devices or "moles"; and particularly concerns a magnetic system for detecting and monitoring the underground location of a mole in terms of its position, attitude and roll.

BACKGROUND OF THE INVENTION

Moles are a form of tunneling device intended to facilitate burial of lengths of relatively flexible structure of small cross section, such as telephone and electrical cables, and of more rigid structures such as service pipes. The advantages of moles over other cable burial methods principally are its speed of operation and lack of disrupting impact on ground surface activity. Broadly, a mole system consists of the mole itself, which is missile like and includes propulsion, steering, and towing means; and a guidance system which defines a desired underground path, detects the mole's location with respect to that path and issues steering instructions for guiding the mole along the path.

Detection of the mole's location and orientation involves not only the mole's overall position in fixed three-dimensional soil, but also its heading and roll. A frame of reference accordingly is needed which substantially defines the desired trajectory and yields information on where the mole is with respect to it. The reference frame should also enable the heading—that is, pitch and yaw—and the roll to be measured, since these quantities are required for steering and stable guidance. The frame of reference, then, should generate characterizing expedients which are related to trajectory, position, heading and roll. The mole must be equipped with some means for measuring the characterizations at each point. These measurements then can be converted to steering commands which correct position and attitude deviations and maintain the mole on the desired trajectory.

One primary frame of reference resorted to in some earlier burrowing device guidance systems is gravity itself. The implementation involves, for example, two pendulous members with associated commutators and potentiometers arranged to swing in mutually perpendicular planes fixed within the mole. But since gravity is a single uniform force field, only roll and pitch data can be derived. Further, even were these data sufficient to guide a mole, the mechanical nature of the pendulum in a mole whose propulsion system develops tremendous impact forces make for errors and breakdowns.

Besides being free of moving parts and breakdown, however, a workable mole detection scheme must meet other specifications, not all of which are immediately apparent. It must generate unambiguous, accurate and reasonably continuous indicia of mole position, heading and roll. The scheme must allow for potentially large differences between actual and intended position to be resolved into correct steering commands. Importantly, the reference frame must be simple to set up in practice and equally simple to revise, if desired. It must be usable on a variety of terrains without requiring a terrain survey beforehand. Further, the information flow from the reference frame to the mole must be fully compatible with the soil medium in which the mole operates. Finally, the detection scheme should be simple in construction, inexpensive, and easy to operate.

There are today no detection schemes known to applicants that offer all of the performance criteria noted.

Accordingly, a primary object of the invention is to detect the position, attitude and roll of a remotely operating mole.

An added object of the invention is to effectively steer a mole in accordance with a desired underground path.

A specific object of the invention is to maintain a given depth to position relationship during the underground operation of a mole.

A further object of the invention is to allow the quick, easy and certain establishment of such a path under any field conditions that might be encountered.

Another object of the invention is to establish a frame or frames, of reference for detection of mole location that simplifies the processing of the data into location parameters and thereafter into mole steering commands.

SUMMARY OF THE INVENTION

The invention, broadly, involves the tracking of an operating mole through detection within the mole of the field vectors of two superimposed magnetic fields formed along the desired route, the two fields differing by a time, frequency or phase factor and also differing in geometric shape; and the translation of the field vectors into steering commands.

In one specific embodiment of the invention, each of two electric current loops geometrically prescribed by conducting wires and hereafter denoted antenna loops is suitably positioned in a planar array on the ground over the path which the mole is to follow. One is a dipole loop, the other a quadrupole loop. These choices provide fields that are geometrically different in the sense that they are not similar and concentric. The loops are oblong, with their outer legs substantially coincident in space. The plane normal to the antenna loop plane, and including the quadrupole center leg, defines the plane which contains the mole's desired trajectory. By setting the antenna loop half-spacing—i.e., the distance between a center leg and outer leg—one can determine, in accordance with another facet of the invention, the mole depth in terms of some multiple of the half-spacing. The half-spacing can be of the order of one foot in the dipole-quadrupole scheme. As laid out on the ground and spaced, then, the antenna loop are the basic detection frame of reference.

The loops are sequentially energized with AC current at a frequency of, for example, 5 kHz. An alternate method is to energize both loops simultaneously at separate frequencies of, for example, 4 kHz. and 7 kHz. Each loop produces a different magnetic field pattern in space. At any instant, however, the magnetic field pattern associated with a given loop is uniform along the loop length. Three magnetometers—wire coils or Hall generators, for example, whose sensitive axes are mutually orthogonal—are rigidly mounted in the mole, with one of the coils axially coincident with the mole's longitudinal axis.

Each of the two magnetic fields is evidenced at any given point as a vector quantity which can be resolved into three orthogonal components in accordance with the primary reference frame established by the orientation and leg spacing of the antenna loops. At any point, there thus will occur six magnetic field vector components, three for each of the two fields. Each component induces corresponding voltages in the coils rigidly mounted in the mole. The induced voltages, when resolved and processed in accordance with one facet of the invention, are used to compute: mole position within a plane perpendicular to the antenna legs; heading with respect to a line parallel to the central antenna axis and representing the desired trajectory; and roll as measured by the angle through which a reference point on the mole's surface has rotated about the mole's center line axis. The mole position along the length of the trajectory is simply obtained either by monitoring the cable payout or by a device such as a land mine detector.

The three quantities that are turned to account to detect the mole's position are the magnitude of each field vector at the location of the coils, and the angle included between these vectors. It has been realized that, in a dipole-quadrupole antenna system, if the outer legs of the dipole and quadrupole loops carry equal currents, the distance (measured in multiples of the antenna wire-spacing) of the position-sensitive coils from the center conductor, or origin, is exactly equal to the ratio of the dipole field strength $\vec{D}$ to the quadrupole field strength $\vec{Q}$. Further, the polar angle $\psi$ at the origin is exactly equal to the included angle between the dipole and quadrupole vectors. The quantities R, $\psi$ provide the desired mole position data. The manner in which heading and roll data is derived from the six magnetic field vector components pursuant to the invention, will be examined in detail hereinafter.

One broad feature of the invention, accordingly, concerns the detection of position, heading and roll of a moving burrowing device by detection within the device of the field vectors of two distinct magnetic fields created by two antenna loops placed on the ground along the desired trajectory.

Another feature of the invention involves the sensing at a given point of two magnetic fields which are distinguishable by a time, frequency or phase factor, the sensing being in terms of the field strength and the intersection angle of the fields, and being achieved by magnetometers mounted in the mole along mutually orthogonal axes, one being disposed axially on the mole center line.

A further feature of the invention involves a two-loop antenna system consisting of a dipole and a quadrupole antenna which provide advantageously suitably simple relation of the magnetic field invariants to mole position.

Further objects, features and advantages of the invention will be apprehended from a reading of the description to follow of an illustrative embodiment thereof.

DETAILED DESCRIPTION OF AN ILLUSTRATIVE EMBODIMENT

What follows is a description of a detection system in which the dual antenna loop configuration, the signals for generating the magnetic fields, and the definitions for mole location are all quite specific. It should be understood at the outset that any and all of these specifics can be varied extensively in the practice of the invention as earlier summarized. Similarly, the signal processing philosophy to be described, and the illustrative circuitry for translating the signals into steering commands represent but one of numerous equivalent implementations of the broad scheme herein envisioned.

OVERALL SYSTEM

Figure 1:
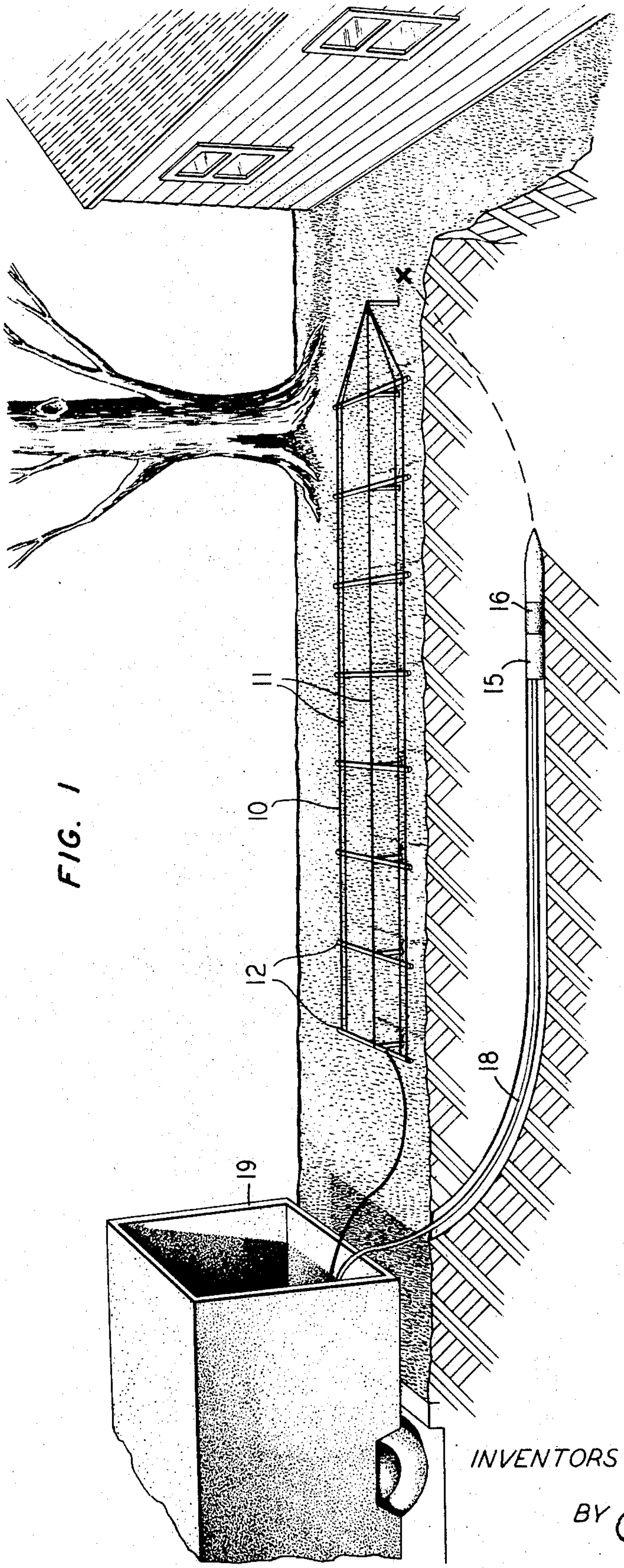
FIG. 1 is a schematic side perspective view showing an embodiment of the detection system under operating conditions.
Figure 2:
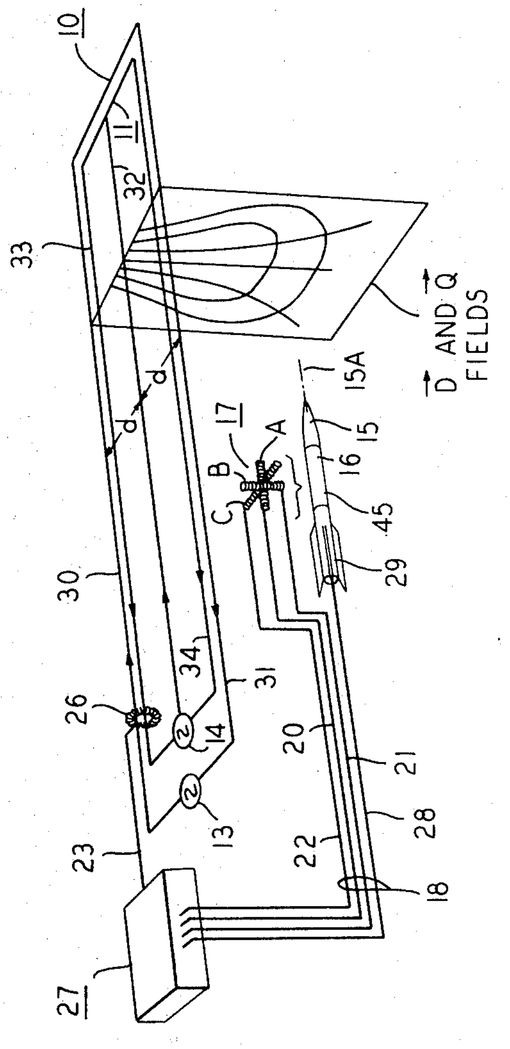
FIG. 2 is a block schematic diagram of the overall detection system, including a preferred embodiment of the antennae.

FIG. 1 illustrates a typical operating situation of a mole, wherein the preferred dipole-quadrupole antenna loop system is employed. The detection and guidance system as a whole is shown in FIG. 2. Suppose that it is desired to burrow a path for electrical and telephone cables under a lawn from a street conduit to a private home. Pursuant to the invention, two antenna loops—the one designated 10 comprising the dipole loop D and the one designated 11 comprising the quadrupole loop Q—are laid out on the ground in accordance with the desired mole trajectory. The antenna loops advantageously may be mounted on T-pads 12 which maintain the proper half-spacing *d*. As seen in FIG. 2 a first current generator 13 is connected into loop 10, and a second current generator 14 is connected into loop 11. These currents may be characterized by differing time, frequency or phase factors, or some combination thereof.

Within the mole, designated 15, a detection section 16 is set asde for housing a magnetometer assemblage 17. Assemblage 17 consists of three coils designated A, B, C. The sensitive axes of coils A, B, C are mutually orthogonal. The sensitive axis of coil A is coincident with the mole's longitudinal axis 15A. An umbilical cord 18 contains the power and guidance connections between the mole and surface equipment located, for example, in a truck 19. Three conductor pair connections 20, 21, 22 are run in cord 18 from the respective coils A, B, C. A reference coil 26 whose function will be described is wound as a torroid around one leg of the antenna loops 10, 11.

The outputs of coils A, B, C and of reference coil 26 are applied to a special purpose detection computer 27. Here, the magnetic field vector components detected as voltages by magnetometer package 17 are converted to position, heading and roll indicia. From these, steering directions are generated and sent along steering control line 28 to the steering system 29 of the mole.

What follows are more detailed descriptions of each of the components of the inventive mole detection and guidance scheme, and their interrelationships.

ANTENNAE CONFIGURATION

The antennae must in general consist of two distinct circuits whose magnetic fields can be individually detected. This may be done by sequential operation of the antennae, simultaneous operation of the antennae at separate frequencies, or simultaneous operation of the antennae at a phase difference and at the same frequency. Furthermore, the antennae must have a configuration which allow simple detection computations and are relatively insensitive to small measurement and calibration errors. The dipole-quadrupole antennae possess these properties.

Antenna loop 10, the D-loop, consists of an outgoing leg 30 and a return leg 31. Antenna loop 11, the Q-loop consists of an outgoing center leg 32 and two return legs 33, 34. Advantageously, all of the mentioned legs are parallel. The distance *d* which spaces the center leg 32 from the other legs is uniform except at the far end where the loops may come to a point as depicted in FIG. 1. The value of this expedient is explained later. The legs 30, 33 and the legs 31, 34 advantageously may be contained within their own respective outer jackets to facilitate handling.

When energized by the AC generators 13, 14, loop 10 produces a dipole field, and loop 11 produces a quadrupole field. In the present illustration, the two currents and therefore the two resulting magnetic fields, are further distinguished by a frequency factor. The two magnetic fields are generated by time-varying sinusoids, although other shapes of signals could be employed. The frequency of the dipole field is 4 kHz. and that of the quadrupole field is 7 kHz. to cite but one set of choices. If the magnetometers are coils, the frequency range of operation is between 1 kHz. and 10 kHz. If Hall effect magnetometers are used, the range of operation is between 0 and 1 kHz. for example.

Figure 3:
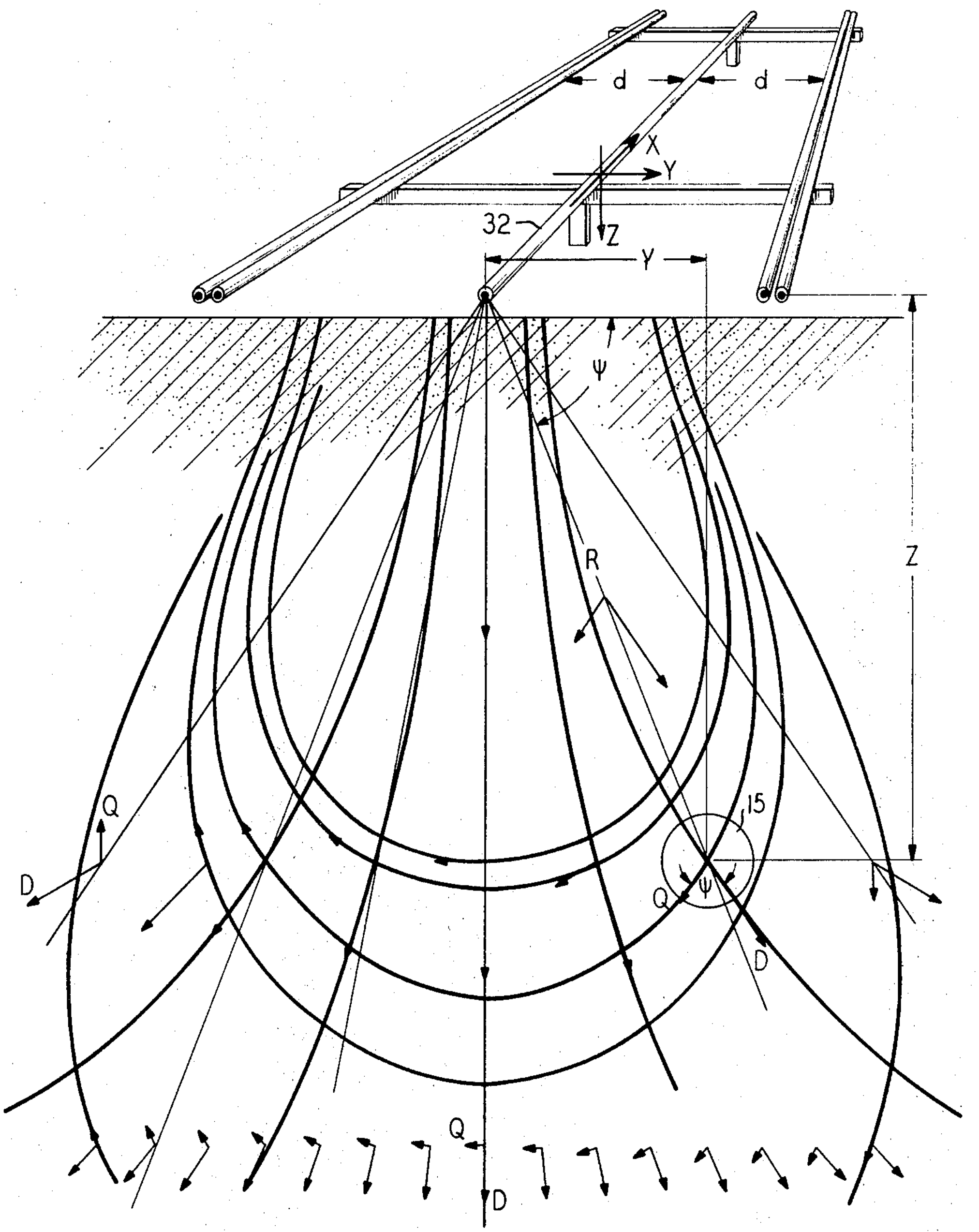
FIG. 3 is a schematic perspective diagram partially taken in a plane perpendicular to the loops and showing the antennae, their magnetic field pattern, field vectors with included angle, and the mole.

FIG. 3 depicts a vertical cross-sectional view of the dipole and quadrupole fields superimposed, taken perpendicular to the legs 30 through 34. Several flux lines of each field are shown; and some arbitrary dipole and quadrupole field vectors drawn roughly to scale are shown for specific points within the plane normal to the antennae. These assume equal currents in the outer legs of the dipole and quadrupole loops. An orthogonal axis system, X, Y, Z is defined by the loops 10, 11, the arrow heads indicating the plus-direction. The X-axis is coincident with center leg 32; the Y-axis falls in the antenna loop plane; and the Z-axis is normal to this plane.

MAGNETOMETER CONFIGURATION AND STRUCTURE

Polar position coordinates, pitch, yaw and roll data are computed from voltages magnetically induced in magnetometers mounted within the mole. It should be apparent from the preceding that the requisite voltages could be derived from any one of numerous possible magnetometer configurations within the mole. Simplified calculations result, however, when three magnetometers are employed with their sensitive axes in mutually orthogonal relation, one axis being coincident with the mole longitudinal axis.

Figures 4, 8:
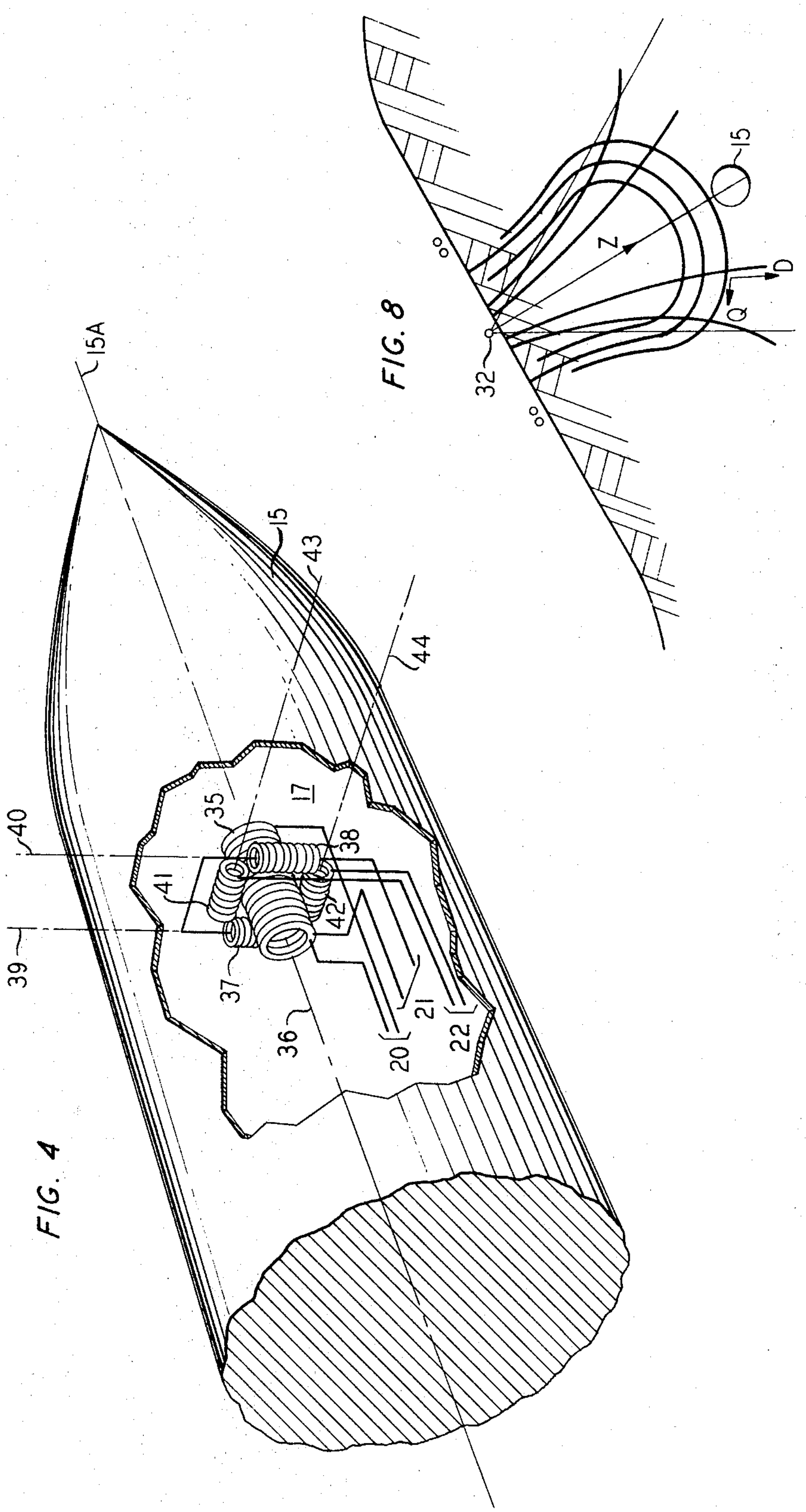
FIG. 4 is a perspective side view in partial cutaway of the magnetometers mounted in the mole.
FIG. 8 is a schematic illustration taken in a plane perpendicular to the antenna loop plane, showing the antenna laid out across an incline.

FIG. 4 depicts such a system of magnetometers mounted as described above in detection section 16 of the mole. In the present embodiment, the magnetometer assembly 17 are wound coils sensitive to time rates of change of the magnetic field strength. Coil A is a single coil, denoted 35, with its sensitive axis 36 coincident with the longitudinal axis 15A of the mole. Coil B consists here of a pair of connected coils 37, 38 symmetrically mounted about coil 35 with their sensitive axes 39, 40 falling in the plane normal to axis 36, and being parallel to each other. Coil C also comprises two connected coils 41, 42 disposed on opposite sides of coil 35, with their sensitive axes 43, 44 located in the plane with, and being perpendicular to, axes 39, 40. The assembly 17 is rigidly mounted by suitable means (not shown) in section 16 of mole 15 with the coils 37, 38 and 41, 42 having a known orientation with respect to the steering surfaces which the mole employs.

Voltages developed in coil 35 appear across conductor pair 20. The coil pair 37, 38 are connected in series and the combined voltage induced in these appears across wire pair 21. Similarly, coils 41 and 42 are connected in series and the combined voltage induced therein appears across wire pair 22.

A principal virtue of using three mutually perpendicular magnetometers rigidly mounted within the mole, is that the pendulus mechanisms of the prior art and their attendant brushes, slip rings, and potentiometers are completely eliminated. It is necessary, however, that the skin or shell of the mole which surrounds the magnetometers shall not unduly attenuate the magnetic field. The skin at this section is termed a window area, designated 45 in FIG. 2. Advantageously, window 45 is made of high strength stainless steel, chosen for its nonmagnetic, poor electrical conductivity properties as well as its strength.

POSITION AND ATTITUDE

The dipole-quadrupole antenna loop and the magnetic fields produced by each have been discussed and illustrated with the aid of FIG. 3. Once the antenna loops are laid out with respect to the ground and the loops energized as above, the fields so produced become a frame of reference which itself is fixed with respect to the antenna loops. The five location parameters can now be fully defined with the aid of FIGS. 5, 5A, 5B, and 5C in terms of the geometry of FIG. 3.

Figures 5, 5A, 5B, 5C:
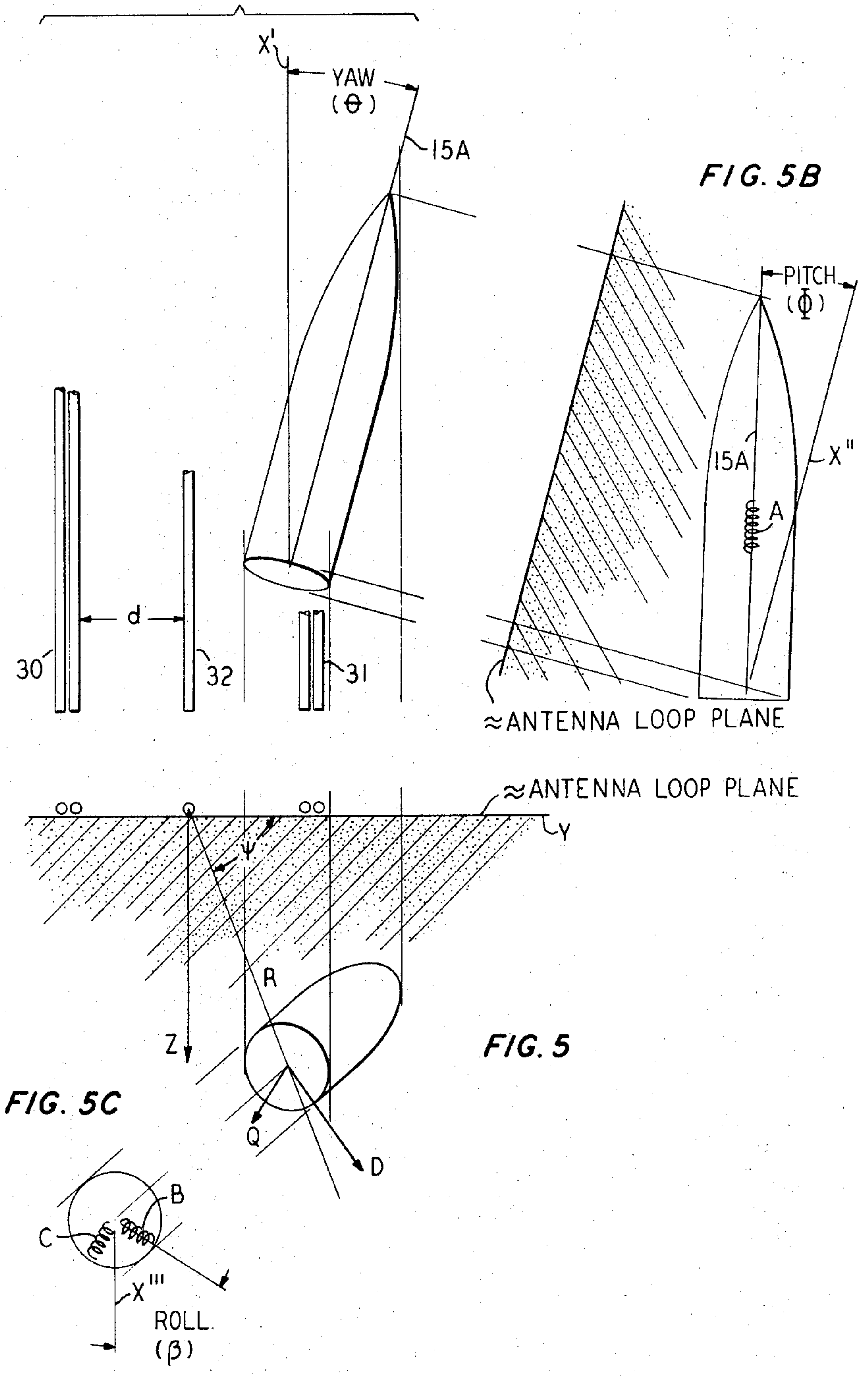
FIG. 5 is a schematic perspective taken in a plane perpendicular to the antenna loop lane, and showing the position coordinates R and $\psi$ in true size.
FIG. 5A is a plane view of the antenna loops in the length, showing the yaw $\theta$ also in true perspective.
FIG. 5B is a projection of FIG. 5A showing the pitch $\Phi$ in true perspective.
FIG. 5C is a projection of FIG. 5 showing the roll $\beta$ in true perspective.

As depicted in FIGS. 3 and 5, the location of a mole 15 in the Y–Z plane is specified by a polar angle $\psi$, and a radial distance, R. $\psi$ is measured clockwise from the ground plane as the mole travels into the page; and R is measured from center wire 32 of loop 11.

The yaw angle, $\theta$, is depicted in FIG. 5A which is a schematic plan view of the antenna loops in true length. In FIG. 5A, the mole's longitudinal axis line is not in true length; but the yaw angle $\theta$ is seen as a true angle, as measured between the projection X′ of the mole's longitudinal axis 15A onto the X–Y plane, and wire 31 which, of course, is parallel to center wire 32.

The pitch angle, $\Phi$, is defined in FIG. 5B as the angle between the mole's longitudinal axis 15A and a line X″ parallel to the antenna loop plane. Angle $\Phi$ falls in a plane perpendicular to the antenna plane and includes the mole's longitudinal axis in true length. The sensitive axis of the A coil, it will be remembered, is coincident with the mole's longitudinal axis 15A.

The roll angle measures how much the mole has rotated about its longitudinal axis from a nominal starting position in which it is assumed that coil C is parallel to the X–Y or antenna loop plane, and coil B is perpendicular thereto, as depicted in FIG. 2. In practice, this will rarely be the case; and so in FIG. 5C the mole 15 is arbitrarily given a pitch upward, and a yaw to the right, and a slight counterclockwise rotation, to represent the more generalized condition.

The roll angle is denoted in FIG. 5C by the angle $\beta$ which is defined as the angle between coil B's sensitive axis and a line X‴ perpendicular to the X–Y plane of the antenna loops.

The polar angle $\psi$, as earlier noted, is exactly equal to the angle between the D and Q field vectors. R is measured in antenna widths, *d* being the loop half-spacing as in FIG. 3; and is exactly equal to the ratio $$\frac{|\vec{D}|}{|\vec{Q}|}$$

The pitch angle $\Phi$ and the yaw angle $\theta$ can also be calculated exactly from the following equations:

$$\text{Sin } \Phi = \frac{D_A Q_Y - Q_A D_Y}{|\vec{D}||\vec{Q}| \sin \psi} \quad (1)$$

$$\text{Sin } \theta = \frac{Q_A D_Z - D_A Q_Z}{|\vec{D}||\vec{Q}| \sin \psi \cos \Phi} \quad (2)$$

In the above equations $D_A$ and $Q_A$ are the components of the dipole and the quadrupole magnetic fields along the mole's longitudinal axis 15A. Hence $D_A$ and $Q_A$ are proportional to the measured signals from coil A. Also, $D_Y$, $D_Z$, $Q_Y$, $Q_Z$ are components of the dipole and quadrupole magnetic fields along the Y and Z axes. These quantities can be computed from the depth Z, lateral position Y and antenna spacing $d$ with the following equations:

$$\frac{D_Y}{|\vec{D}|} = \frac{2YZ}{R_1 R_2} \quad (3)$$

$$\frac{D_Z}{|\vec{D}|} = \frac{Z^2 - Y^2 + d^2}{R_1 R_2} \quad (4)$$

$$\frac{Q_Y}{|\vec{Q}|} = -\frac{Z[Z^2 + d^2 - 3Y^2]}{R R_1 R_2} \quad (5)$$

$$\frac{Q_Z}{|\vec{Q}|} = \frac{Y[3Z^2 + d^2 - Y^2]}{R R_1 R_2} \quad (6)$$

$$R_1 = \sqrt{Z^2 + (Y+d)^2} \quad (7)$$

$$R_2 = \sqrt{Z^2 + (Y-d)^2} \quad (8)$$

$$R = \sqrt{Z^2 + Y^2} \quad (9)$$

The cartesian position coordinates Y and Z are computed from the previously detected polar position coordinates R and $\psi$ with the following equations:

$$Z = R \sin \psi \quad (10)$$

$$Y = R \cos \psi \quad (11)$$

Finally, the evaluation of Equations 1 and 2 is made possible by noting that $|\vec{D}|$ and $|\vec{Q}|$ are computed from the sums of the squares of the three measured coil output voltages.

$$|\vec{D}| = (D_A^2 + D_B^2 + D_C^2)^{1/2} \quad (12)$$

$$|\vec{Q}| = (Q_A^2 + Q_B^2 + Q_C^2)^{1/2} \quad (13)$$

The roll angle $\beta$ can also be calculated exactly from the following equation:

$$\beta = \delta + \alpha \quad (14)$$

where $$\text{Sin } \delta = \frac{D_C}{|\vec{D}|} \quad (15)$$

$$\text{Cos } \delta = \frac{D_B}{|\vec{D}|} \quad (16)$$

$$\text{Sin } \alpha = \frac{D_Y}{|\vec{D}|} \quad (17)$$

$$\text{Cos } \alpha = \frac{D_Z}{|\vec{D}|} \quad (18)$$

However a sufficient approximation of pitch, yaw and roll can be made from the practical ease of mole detection and guidance where the depth Z is greater than the lateral position Y and the pitch and yaw are small angles. This approximation holds only directly below the antenna axis but is useful to at least a distance either side of the antenna of about ¼ of the depth.

In all the previous equations $Y^2$ is neglected with comparison to $Z^2$ to obtain a complete identification of position and attitude variables from magnetometer signals such as those generated in coils A, B and C which yield sufficiently definite information to enable mole guidance. These are given by the following equations, taken in conjunction with FIG. 3:

$$\frac{R}{d} = \sqrt{\frac{D_B^2 + D_C^2}{Q_B^2 + Q_C^2}} = \frac{|\vec{D}|}{|\vec{Q}|} \quad \text{(polar distance)} \quad (19)$$

$$\frac{\pi}{2} - \psi = \frac{D_B Q_B + D_C C_C}{|\vec{D}||\vec{Q}|} \quad \text{(polar angle)} \quad (20)$$

$$\Phi = \frac{D_A}{|\vec{D}|} + 2\left(\frac{\pi}{2} - \psi\right)\frac{Q_A}{|\vec{Q}|} \quad \text{(pitch)} \quad (21)$$

$$\theta = \frac{Q_A}{|\vec{Q}|} - 3\left(\frac{\pi}{2} - \psi\right)\frac{D_A}{|\vec{D}|} \quad \text{(yaw)} \quad (22)$$

$$\beta = \delta + 2\left(\frac{\pi}{2} - \psi\right) \quad \text{(roll)} \quad (23)$$

where $$\text{Sin } \delta = \frac{D_C}{|\vec{D}|}$$

$$\text{Cos } \delta = \frac{D_B}{|\vec{D}|}$$

It should be noted that the above 5 equations are dimensionless. Hence, if all the coils A, B, C have the same sensitivity, then the D's and Q's can be interpreted either as magnetic fields or as induced coil voltages. With the latter interpretation, $Q_B$, for instance, is the voltage measured across the terminals of coil B when the quadrupole antenna is energized.

DESCRIPTION OF COMPUTATION CIRCUIT

Figure 6:
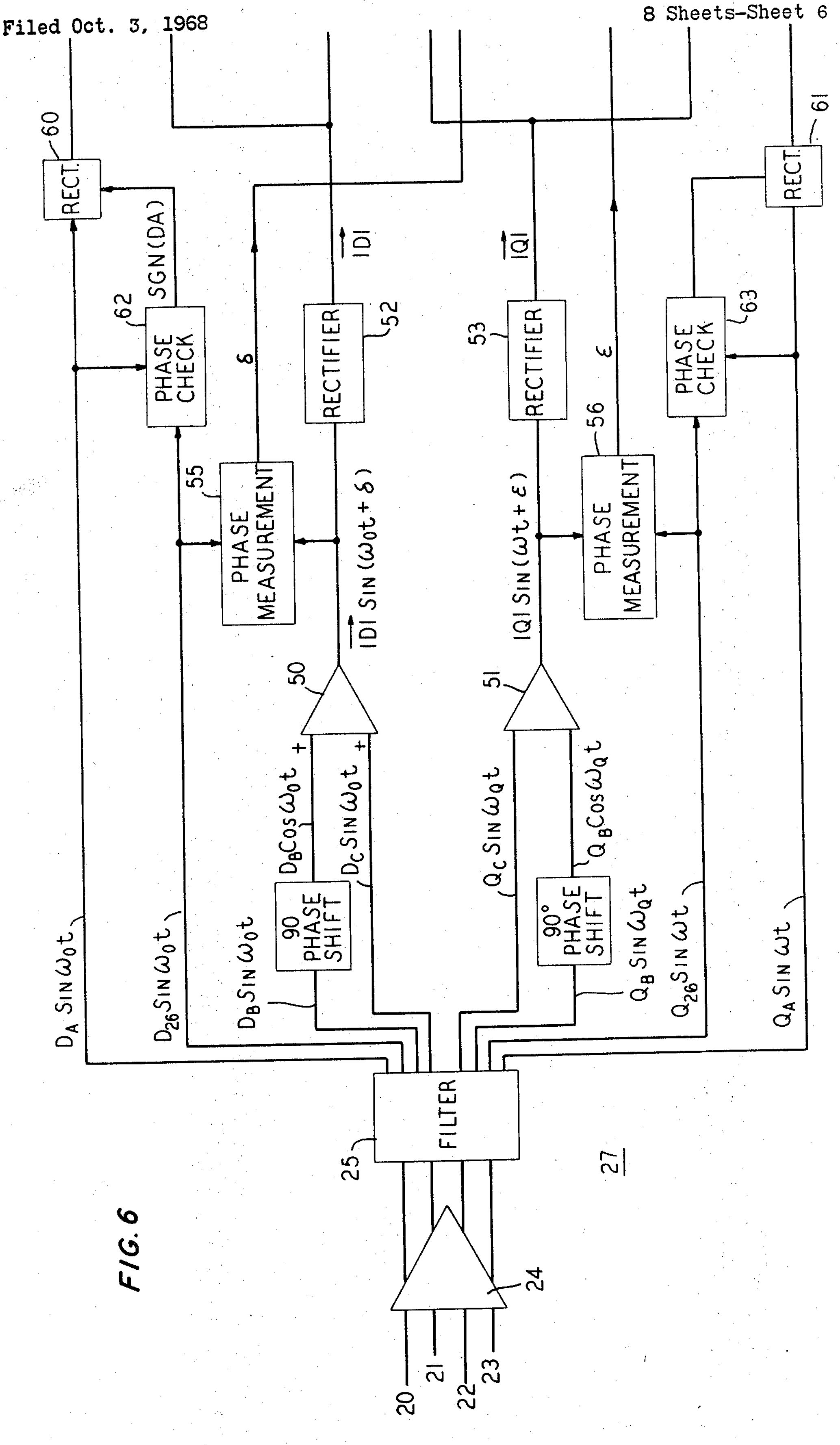
FIGS. 6 and 6A are schematic block diagrams of a circuit for converting the magnetometer voltages to location indicia.
Figure 6A:
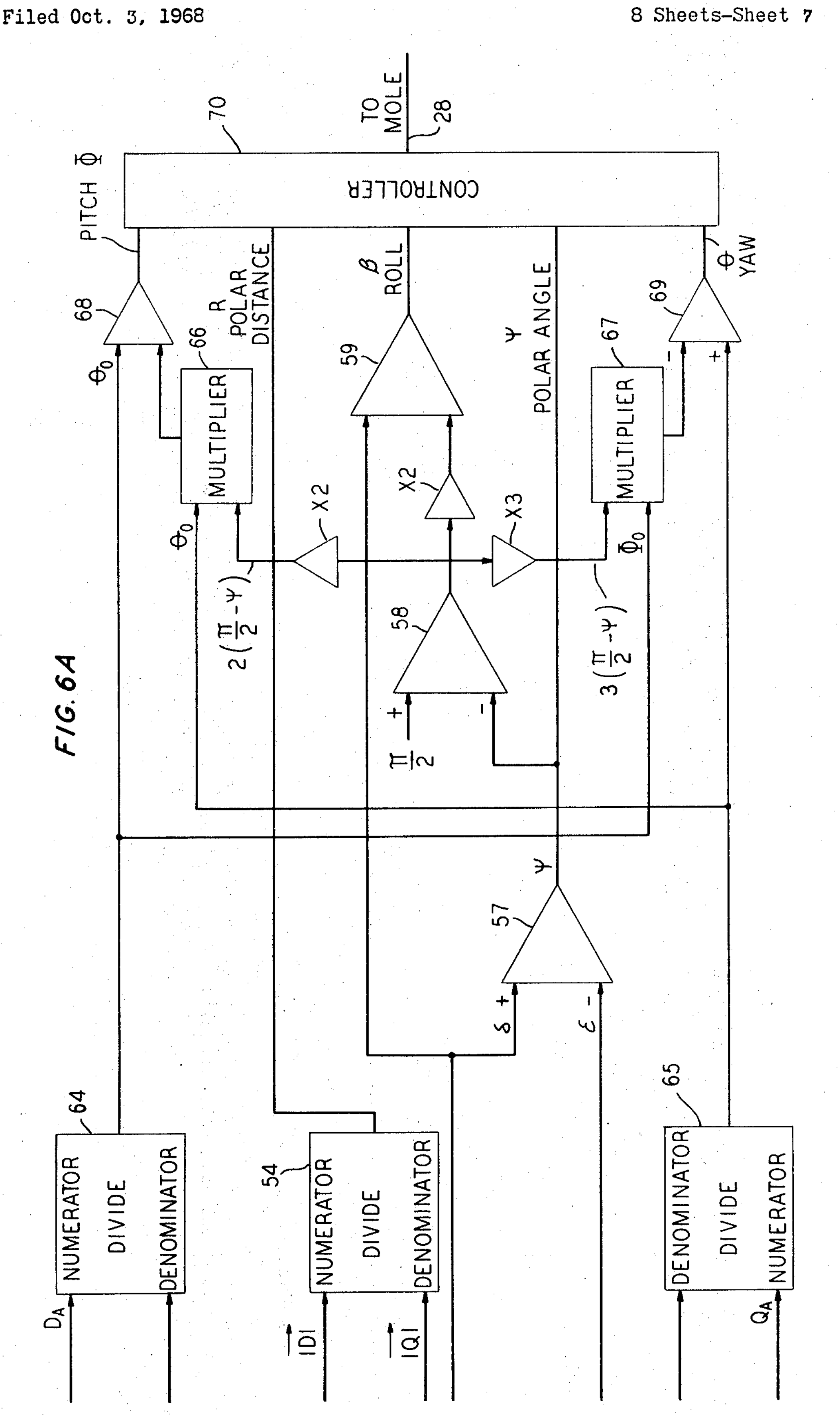

The sinusoidal coil voltages, which are proportional to the dipole and quadrupole magnetic field components along the axes of coils A, B, C and 26 are carried on wires 20, 21, 22 and 23 to computer 27 as shown in FIGS. 6 and 6A. Wire 20, coming from a wire coil A, carries the two signals proportional to $D_A$ and $Q_A$. $D_A$ is at the dipole antenna frequency $\omega_D$ and $Q_A$ is at quadrupole antenna frequency $\omega_Q$. Similarly wire 21 from coil B carries the two signals $D_B$ and $Q_B$ at frequencies $\omega_D$ and $\omega_Q$ and likewise for the signals $D_C$ and $Q_C$ on wire 22 and signals $D_{26}$ and $Q_{26}$ on wire 23.

All the signals are fed into amplifiers 24 and thence into filter 25 where the dipole signals at frequency $\omega_D$ are separated from the quadrupole signals at frequency $\omega_Q$. The output of the filters gives eight signals proportional to $D_A$, $D_B$, $D_C$, $D_{26}$, $Q_A$, $Q_B$, $Q_C$, and $Q_{26}$.

The proportionality constants relating each of these signals to the corresponding magnetic field component are identical, provided all the magnetometers have the same sensitivity. For purposes of this description, it will be assumed that all the magnetometers have the same sensitivity. Therefore, since all the subsequent computations involve only ratios of the signals, the proportionality constant cancels out of the computation. Hence, for instance $Q_B$ can be interpreted as either the component of $\vec{Q}$ along the coil B, or the measured voltage across the coil B due to the $\vec{Q}$ field.

The first step in the computer circuit 27 is to obtain $|\vec{D}|$ and $|\vec{Q}|$. These quantities are required in all the subsequent detection computations. This is accomplished in the circuit by phase shifting $D_B$ a quarter cycle (90 degrees) and adding to $D_C$. It can be shown by trigonometric identity that $$D_B \sin\left(\omega_D t + \frac{\pi}{2}\right) + D_C \sin \omega_D t = \sqrt{D_B^2 + D_C^2} \sin(\omega_D t + \delta)$$
$$= |\vec{D}| \sin(\omega_Q t + \delta)$$

where $$\text{Sin } \delta = \frac{D_B}{|\vec{D}|} \text{ and } \cos \delta = \frac{D_C}{|\vec{D}|}$$

Similarly $|\vec{Q}|$ is obtained by phase shifting $Q_B$ a quarter cycle and adding to $Q_C$. The same trigonometric identity applies.

$$Q_B \sin\left(\omega_Q t + \frac{\pi}{2}\right) + Q_C \sin \omega_Q t = \sqrt{Q_B^2 + Q_C^2} \sin(\omega_Q t + \epsilon) = |\vec{Q}| \sin(\omega_Q t + \epsilon)$$

where $$\text{Sin } \epsilon = \frac{Q_B}{|\vec{Q}|} \text{ and } \cos \epsilon = \frac{Q_C}{|\vec{Q}|}$$

Hence, the outputs of summing amplifiers 50 and 51 are sinusoidal voltages with amplitudes proportional to $|\vec{D}|$ and $|\vec{Q}|$ respectively.

MEASUREMENT OF POLAR DISTANCE R

The outputs of summing amplifiers 50 and 51 are fed to rectifiers 52 and 53 and thence to the divider 54 where the radius is computed from the ratio $|\vec{D}|/|\vec{Q}|$.

MEASUREMENT OF POLAR ANGLE $\psi$

The outputs of summing amplifiers 50 and 51 are fed to phase measuring circuits 55 and 56 where the phase angles $\delta$ and $\epsilon$ are converted to DC voltages. The standard coil outputs $D_{26}$ and $Q_{26}$ are used to establish the zero phase reference. The phases are subtracted in summing amplifier 57 to obtain the polar angle $\psi$. The fact that $\epsilon - \delta = \psi$ is not obvious, but can be proven by those skilled in the art.

MEASUREMENT OF ROLL

The polar angle $\psi$ is subtracted from 90 degrees in summing amplifier 58. Twice this output is added to $\delta$ in summing amplifier 59 to obtain the approximate roll angle in accordance with Equation 23.

MEASUREMENT OF PITCH AND YAW

The sinusoidal outputs of the axial coil are fed to rectifiers 60 and 61 and also to phase checking circuits 62 and 63 where it is determined whether these sinusoidal voltages are in phase or out of phase with the standard coil. The rectifier outputs are made positive for the in-phase condition and vice versa. The rectified outputs $D_A$ and $Q_A$ are divided by |D| and |Q| respectively in dividers 64 and 65 to yield a first approximation for pitch and yaw, which are denoted $\Phi_o$ and $\theta_o$ in FIG. 6. As indicated in Equations 21 and 22 a better approximation can be obtained with two additional multipliers 66 and 67 and two additional summing amplifiers 68 and 69 which perform the computtaions $$\Phi = \Phi_o + 2\left(\frac{\pi}{2} - \Psi\right)\theta_o$$

$$\theta = \theta_o - 3\left(\frac{\pi}{2} - \Psi\right)\Phi_o$$

It should be understood that the circuit depicted in FIG. 6 is a functional diagram and that many of the steps shown therein can be combined and condensed. Further, all the functional steps in the computation can be accomplished using state-of-the-art circuitry such as for example that presently employed in analog circuitry.

MOLE STEERING

The signal outputs of computer 27 can be read directly as pitch, polar distance, roll, polar angle and yaw by suitable conventional means; and the mole steering mechanism actuated through connections 28 by an operator.

Alternatively, the outputs of computer 27 can be directed into a second computer 70 shown in FIG. 6 where they are converted into appropriate steering signals which are fed to mole 15. As the mole advances, further signals of pitch, polar distance, roll, polar angle and yaw are developed; and the steering mechanism is adjusted to guide the mole along the desired trajectory.

Figure 7:
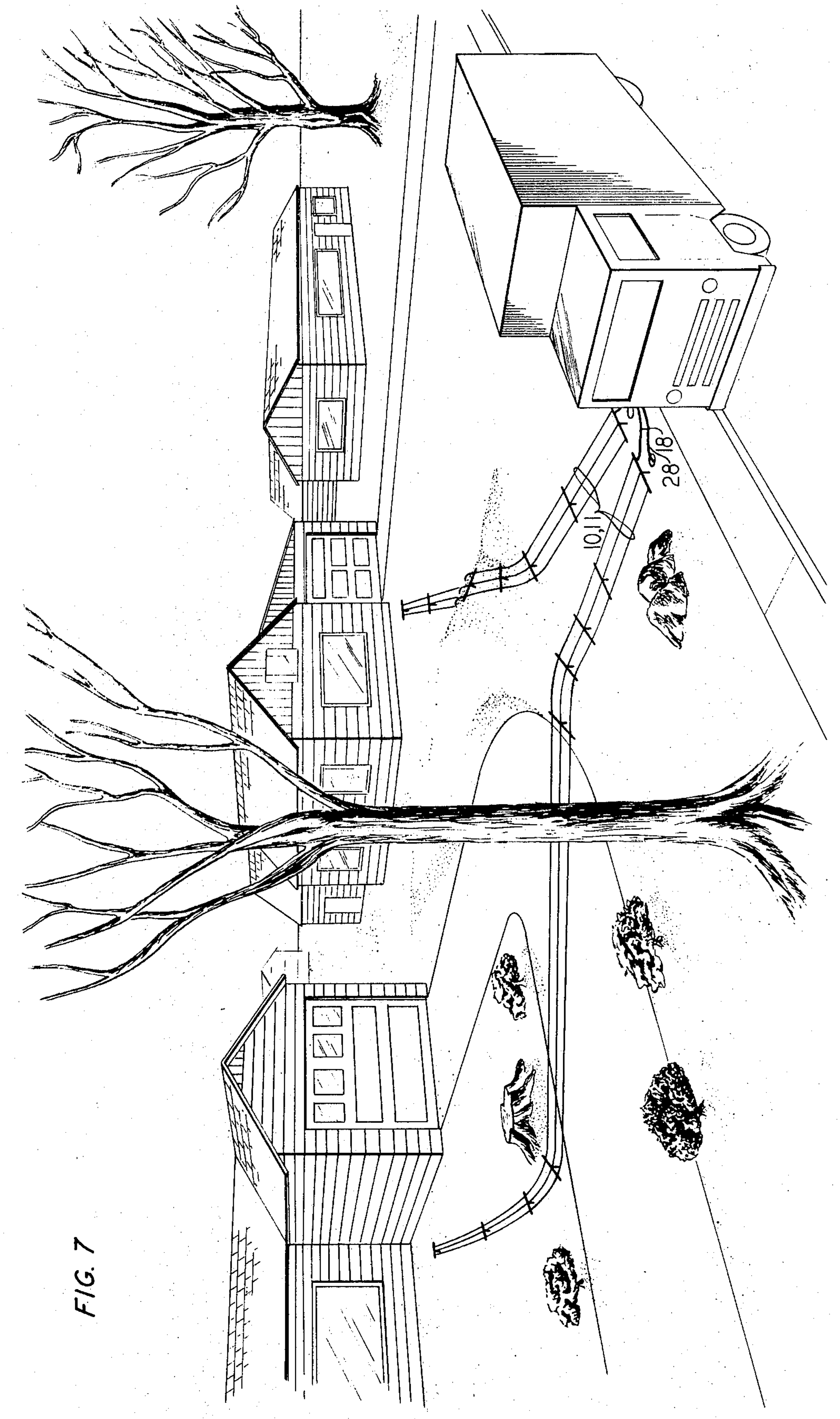
FIG. 7 is a further illustration of mole operating conditions.

The relationship of the antenna loops D, Q to the true horizontal has no bearing on the geometries described and discussed with respect to FIGS. 3, 5, 5A, 5B, and 5C. These geometric relationships are defined with respect to the X–Y–Z coordinate system, the orientation in space of which is determined only by the lay of the antenna loops D, Q. Therefore, it is seen that the geometric relationships also hold when, for example, the antenna loops D, Q are laid out on mounds, as in FIG. 7, or on the side of a hill as in FIG. 8. One consequence of the above is that, with a given loop spacing *d*, and parallelism between the ground level and the antenna loop plane, the mole will home on a path that lies at a constant depth Z, from the ground level. This is illustrated in FIGS. 3 and 8. Or, the loop plane could be tilted with respect to the ground surface to afford, where desired, a further degree of control of the mole's trajectory.

The examples thus far described have involved a constant antenna loop spacing. However, as a consequence of Equations 6 through 8, the polar position coordinate R (and hence the depth Z) depends upon the antenna loop spacing *d*. Accordingly, if *d* is varied, the depth Z which the mole will seek is also varied. By increasing or decreasing the loop spacing *d* it is possible to avoid depth-related obstructions at points along the path. Also, by decreasing the loop spacing *d* to zero, as in FIG. 1, it is possible to specify the point at which the mole will rise from the ground, such as point X in FIG. 1.

It is to be understood that the embodiments described herein are merely illustrative of the principles of the invention. Various modifications may be made thereto by persons skilled in the art without departing from the spirit and scope of the invention.

What is claimed is:

1. Apparatus for detecting the position and attitude of a subsoil missile comprising:

first and second closed current-carrying conductor loops differing in geometric shape and disposed over the desired missile route;

means for applying to said respective loops first and second electrical signals which differ by a time, frequency or phase factor thereby to create magnetic fields under said loops which also differ by such factor;

means for detecting and measuring the spatial components of said magnetic fields; and means for converting said field components into vehicle position and attitude indicia.

2. Apparatus in accordance with claim 1, wherein said first loop is a dipole antenna and said second loop is a quadrupole antenna.

3. Apparatus in accordance with claim 2, wherein the respective side legs of each said antenna are grouped together with the center leg of said quadrupole antenna being disposed equidistant between the two side groups.

4. Apparatus in accordance with claims 1, 2, or 3 wherein said applied electrical signals are time-varying sinusoids.

5. Apparatus in accordance with claims 1, 2, or 3 wherein said applied electrical signals are time-varying sinusoids which differ by a frequency factor.

6. Apparatus in accordance with claims 1, 2, or 3 wherein said detecting and measuring means comprises a trio of inductive coils fixedly mounted in said vehicle with their sensitive axes in orthogonal relation, one such axis being coincident with the longitudinal axis of said missile and the other two axes being in predetermined orientation with respect to the missile body.

7. Apparatus in accordance with claims 1, 2, or 3 wherein said applied electrical signals are time-varying sinusoids which fall within the frequency range of from 1 kHz. to 10 kHz.; and wherein said detecting and measuring means comprises a trio of inductive coils fixedly mounted in said vehicle with their sensitive axes in orthogonal relation, one such axis being coincident with the longitudinal axis of said missile and the other two axes being in predetermined orientation with respect to the missile body.

8. Apparatus in accordance with claim 3 wherein the two side groups of said antenna loops converge substantially to a point at their far end.

9. Apparatus in accordance with claims 1, 2, 3, or 8 wherein said missile includes steering means, and further comprising means for converting said vehicle position and attitude indicia into appropriate movements of said steering means, thereby to guide said missile with respect to said route.

10. Apparatus for detecting the position and attitude of a vehicle comprising:

a plurality of current-carrying conductors laid with a specified spacing upon the ground over the vehicle route;

means for connecting said conductors to form first and second closed loops therewith;

means for applying first and second currents respectively to said loops, the currents differing by a time, frequency or phase factor, thereby to create magnetic fields under the loops which also differ by such factor; and means for detecting and measuring the spatial components of said magnetic fields and for converting same into vehicle position and attitude indicia.

References Cited

UNITED STATES PATENTS

| | | | |
|---|---|---|---|
| 1,696,230 | 12/1928 | Gilbert. | |
| 2,428,360 | 10/1947 | Dingley. | |
| 3,274,546 | 9/1966 | Gunn | 340—25 |
| 3,326,008 | 6/1967 | Baran et al. | 299—30 X |

ERNEST R. PULSER, Primary Examiner

U.S. Cl. X.R.

61—72.7; 299—30; 340—32, 258